United States Patent [19]

Wagener et al.

[11] Patent Number: 4,832,627

[45] Date of Patent: May 23, 1989

[54] INPUT ADAPTER FOR A BUS BAR SYSTEM

[75] Inventors: Hans Wagener, Dietzholztal; Jurgen Zachrei, Dillenburg; Udo Munch, Sinn, all of Fed. Rep. of Germany

[73] Assignee: Rittal-Werk Rudolf Loh GmbH &Co.KG, Herborn, Fed. Rep. of Germany

[21] Appl. No.: 131,782

[22] Filed: Dec. 11, 1987

[30] Foreign Application Priority Data

Dec. 12, 1986 [DE] Fed. Rep. of Germany ....... 3641519

[51] Int. Cl.$^4$ ............................................. H01R 9/00
[52] U.S. Cl. ..................................... 439/715; 439/775
[58] Field of Search ............... 439/715, 721, 775, 776, 439/110

[56] References Cited

U.S. PATENT DOCUMENTS

| | | | |
|---|---|---|---|
| 2,997,628 | 8/1961 | John | 439/715 X |
| 4,002,398 | 1/1977 | Hanisch et al. | 439/715 X |
| 4,169,652 | 10/1979 | Höckele et al. | 439/776 X |
| 4,214,805 | 7/1980 | Faulconer | 439/715 X |
| 4,659,169 | 4/1987 | Ustin et al. | 439/715 |

Primary Examiner—William L. Sikes
Assistant Examiner—Frank González

[57] ABSTRACT

An improved input adapter for electrically connecting input leads with the bus rails of a bus bar system. Connection at any desired location along the bus rails is made possible without drilling holes in the bus rails by an arrangement in which contact plates are held in an adapter housing facing and in position for contact with the bus rails, a clamping arrangement for electrical connection of each contact plate with its corresponding rail, including a U-shaped clamp with clamp ends formed at the free ends of clamp side legs and engaging behind the bus rail, a clamp screw extending adjustably through a threaded hole in a clamp cross portion to connect the contact plate and bus rail, the contact plates having threaded holes in portions away from the clamps for screw attachment of the input leads.

14 Claims, 2 Drawing Sheets

INPUT ADAPTER FOR A BUS BAR SYSTEM

FIELD OF THE INVENTION

This invention is related generally to an input adapter for a bus bar system for electrical connection of input leads with bus rails.

BACKGROUND OF THE INVENTION

The connection of input leads to the bus rails of a bus bar system is always difficult when the input point is to be at any position desired along a bus rail. This typically requires additional mounting efforts at the point of connection, since holes typically must be drilled in the bus rails in order to screw the input leads to the bus rails, and thereby establish electrical contact. Since such extra drilling also weakens the profile of the bus rail, this type of connection of input leads to the bus rails of a bus bar system is not satisfactory.

OBJECT OF THE INVENTION

It is the object of this invention to provide an input adapter, of the type mentioned in the introduction, which can be attached at any desired point along the bus rails without drilling holes into the bus rails, while establishing clear electrical contact between the input leads and the bus rails.

SUMMARY OF THE INVENTION

This invention achieves this objective in the following manner. Contact plates are held in an adapter housing, which is placed over the bus rails, and are aligned with each of the bus rails. Each contact plate can be connected electrically with its assigned bus rail by means of a clamp arrangement, involving a U-shaped clamp engaging the rear side of the bus rail with a clamp end which is formed at the free end of a clamp side legs. A clamp screw, which is adjustable in a threaded hole in a cross member of the clamp, connects the bus rail with the contact plate. The contact plates are furnished, in a portion away from the clamp area, with threaded holes and/or openings for screwing on the input leads.

The contact plates are already held in proper alignment with respect to the bus rails of the bus bar system by virtue of the adapter housing. The clamps ends are hooked behind the bus rails when the adapter housing is set on the bus rails. As the clamp screws are tightened, the contact plates are connected tightly with their respective bus rails so that electrical contacts with large leads may be screwed onto the contact plates in the standard manner beyond the clamp area. If a screw mount is not tightened properly, spark transfer can result. This can lead to damage to the easily replaceable contact plate; however, the bus rail will not be affected.

In the case of a multi-phase version of the input adapter of this invention, provision is made for purposes of insulation. The adapter housing consists essentially of a housing plate which can be set on the bus rails, with recesses corresponding to the arrangement of the bus rails, with chambers partitioned for the input lines leading to the contact plates in the recesses by means of side walls and partitions vertically positioned with respect to the bus rails, on the top of the housing plate. The current conducting parts of the different phases are clearly shielded from each other, so that accidental short-circuits are practically eliminated.

A feature provides for holding the contact plates in the recesses of the adapter housing. The contact plates are braced by means of positioning ribs and/or stays which are formed on the partitions bordering the recesses; and the contact plates are held firmly in this position by means of brace springs which are formed at cap portions partially covering the recesses. In such embodiments, a preferred feature provides for the contact plates to be rectangularly shaped and positioned with respect to the bus rails with their longer sides vertical, with the positioning ribs and/or stays bracing the narrow sides of the contact plates.

Since the bus rails can vary in width, depending upon rated current, a further feature which makes the input universally usable provides that the spacing between the two side legs of the clamp is the same as or greater than the width of the contact plates, and that the spacing between the clamp side-leg ends and the clamp cross member is the same size or greater than the sum of the thickness of a contact plate and the maximum thickness of a bus rail.

The grip of the clamp on the bus rail, together with improved contact, is achieved by the fact that the narrow sides of the clamp side legs which face the bus rail are grooved.

In order that the clamping structure of clamp and clamp screw maintain its position with respect to the contact plate held in the adapter housing, even if the input adapter is removed from the bus rails, a socket-shaped guide with a hole through it is formed at the underside of the cap portion facing the clamp. Such socket accepts the clamp screw, which is accessible through the hole.

If the cap portion has a recess aligned, and of corresponding profile with, the positioning rib for the contact plate, then such rib can be formed below the cap portion without the need to use a complicated injection-molding tool with slides for the production of the plastic adapter housing. Instead, a strut can be inserted to form the recess, which serves as the back-cut of the positioning rib.

A secure mounting for the input adapter when it is positioned on the bus rails is provided by furnishing the recesses with bus-rail positioning stays on a side running parallel thereto and coincident with the covering caps. These stays run vertically to the housing plate and parallel to the bus rails.

There are various options for connecting input leads to the contact plates. One option is to have the input lead ends in an eyelet-shaped terminal which is screwed to the contact plate by means of a threaded hole. Another is to have the input lead plate furnished with a threaded hole, with the input lead wire secured to the input lead plate by mans of a U-shaped clamp plate and a clamp screw. Yet another connection may be made by the terminals of an insulated input lead being clamped to the contact plate, which has two threaded holes or openings, by means of a clamp plate and two screws.

Accidental access to current-carrying parts of the input adapter is avoided by shielding between its side walls by means ff a U-shaped cover which is equipped with tabs for insertion in sockets in the connecting braces on the adapter housing.

BRIEF DESCRIPTION OF THE DRAWINGS

The invention is explained in greater detail by reference to drawings illustrating an example, in which.

DETAILED DESCRIPTION OF PREFERRED EMBODIMENTS

Figure 1:
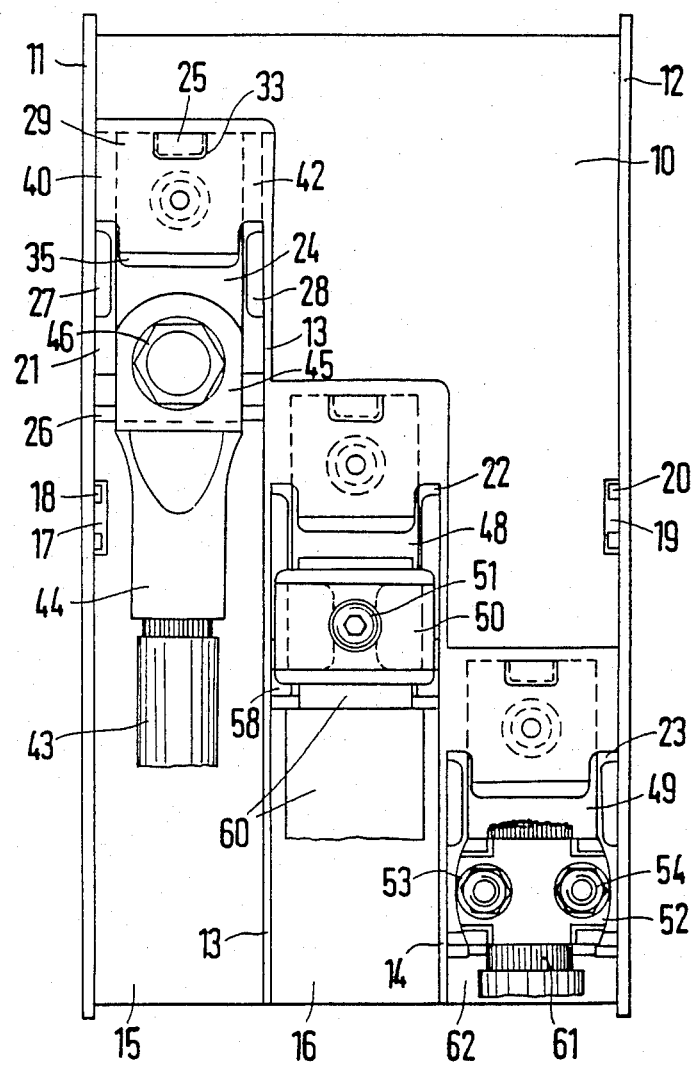
FIG. 1 is a top view of a three-phase input adapter in accordance with this invention.
Figure 2:
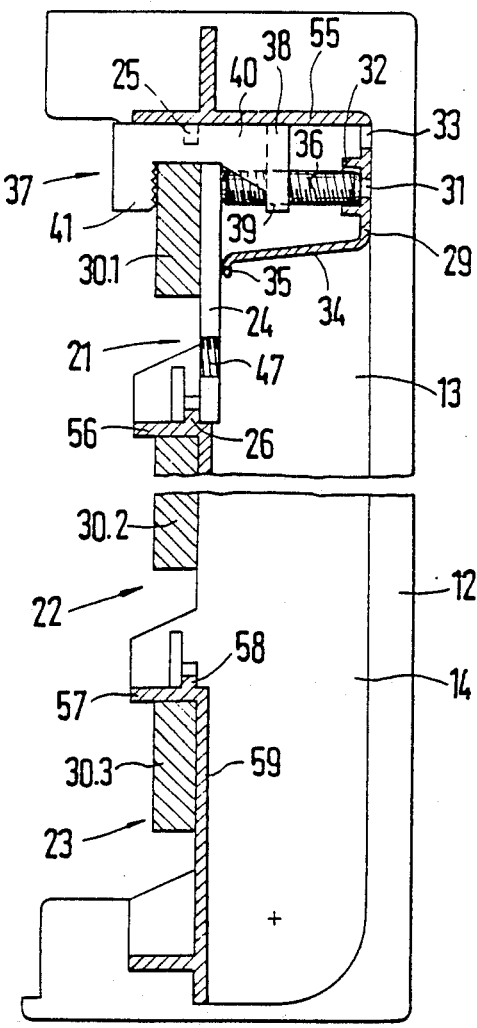
FIG. 2 is a lengthwise section through the input adapter, taken along two chambers.

The adapter housing 10 is a principal element of the input adapter shown in the embodiment of FIGS. 1 and 2. Adapter housing 10 is made as an injection-molded piece and has a housing plate 59 in which the recesses 21, 22 and 23 are formed, specifically, in the chambers 15, 16 and 62 bounded and separated by the wide walls 11 and 12 and the partitions 13 and 14 on top of the base plate 59. As FIG. 1 shows, recesses 21, 22 and 23 are arranged to correspond to the arrangement of the bus rails 30.1, 30.2 and 30.3 of the bus bar system. Recesses 21, 22 and 23 are essentially rectangular and are arranged such that their lengths are vertical with respect to bus rails 30.1, 30.2 and 30.3. The recesses are such that they accept the rectangular contact plates 24, 48 and 49. Contact plates 24, 48 and 49 are held rigidly in recesses 21, 22 and 23 in such a way that their undersides are exposed and can be connected with the bus rails.

As FIG. 2 shows, contact plates 24, 48 and 49 are braced at their narrow ends at their undersides on positioning ribs 25 and stays 26 and 58, respectively. Brace springs 34 support themselves with their ends 35 against the tops of contact plates 24, 48 and 49, and thus hold contact plates 24, 48 and 49 in fixed position in recesses 21, 22 and 23. Brace springs 34 are formed at cap portions 29, which extend partially over contact plates 24, 48 and 49 at one narrow end. Cap portions 29 are connected to the housing through walls 55, 56, 57 and the housing plate 59, and they are vertically offset with respect to the positioning stays for the bus rails 30.1, 30.2 and 30.3, which form support surfaces when adapter housing 10 is placed on bus rails 30.1, 30.2 and 30.3, as FIG. 2 illustrates.

A clamping structure, consisting of a U-shaped clamp 37 and a clamp screw 36, is assigned for each contact plate 24, 48 and 49. Clamp 37 has a cross portion 38 which has a threaded hole 39 into which the clamp screw 36 is screwed. The side legs 40 and 42 of clamp 37 have a spacing therebetween which is the same as or greater than the width of contact plate 24, 48 or 49 so that they can move sideways along contact plate 24, 48 or 49, out of recesses 21, 22 or 23. Hook-like clamp ends 41 are formed at the free ends of side legs 40 and 42 of clamp 37 and engage the rear side of the bus rail 30.1, 30.2 or 30.3. Clamp ends 41 are grooved on their short sides facing the bus rail. A clamp screw 36 is held at its head in the socket-shaped guide section 32 of cap portion 29 and the hole 31 allows access for tools to the face side of the clamp screw 36. Cap portion 29 is furnished with a cut-out 33 aligned with positioning rib 25 and identical in profile to it, to allow for insertion of a post which forms the back-cut for positioning rib 25 in the injection-molded forming process. The other end of clamp screw 36 is engaged with the top of contact plate 24, 48 or 49. As clamp screw 36 is tightened, clamp 37 is adjusted in the direction of cap portion 29 such that clamp ends 41 are pressed against bus rail 30.1, 30.2 or 30.3. In this way, contact plate 24, 48 or 49 is connected over a large surface at the bus rail. The result is that there is very little contact resistance. At the same time, adapter housing 10 is fastened mechanically to the bus rails.

Contact plates 24, 48 and 49 are in this way connected electrically with corresponding bus rails 30.1, 30.2 and 30.3, and those portions not covered by cap portions 29 lie freely accessible in the chambers 15, 16, and 62.

As FIG. 2 shows, contact plate 24 can have its threaded hole 47 in this exposed portion so that the eyelet-shaped connector plate 45 of terminal 44 can be screwed simply by means of a screw 46 to contact plate 24. Terminal 44 is connected to the end of the insulated input lead 43.

If the input lead is shaped as flat contact 60, then a clamp plate 50 and clamp screw 51 are used in order to screw the flat contact 60, furnished with a drilled opening, directly to contact plate 48. In this case, clamp plate 50 is U-shaped and grasps flat contact 60 and contact plate 48 on both sides. The clamp arrangement for the contact plate 48 and the fixing of contact plate 48 in recess 22 does not differ from the clamp arrangement and the fixing of contact plate 24.

As shown, in chamber 62 the insulated end 61 of the input lead can be connected with contact plate 49 by means of the clamp plate 52 and two screws 33 and 54. Clamp plate 52 has two openings for screws 53 and 54, which can be screwed directly into threaded openings in contact plate 49. Contact plate 49 may also have only two holes, however, like clamp plate 52. The screw mounts are then completed by means of screw nuts.

As FIG. 2 shows, partitions 13 and 14 are not as high as side walls 11 and 12. Connecting stays 17 and 19, which have sockets 18 and 20, are formed on the inside of side walls 11 and 12 to facilitate the covering of chambers 15, 16 and 62 by means of a U-shaped lid. The lid is held by tabs which are inserted into the sockets 18 and 20. The side walls 11 and 12 can be lengthened near the narrow end of adapter housing 10 beyond the lower end of the housing plate 59 in order to facilitate placement of the input adapter on the bus rails. Side walls 11 and 12 are spaced apart widely enough in the area of recesses 21, 22 and 23 below housing plate 59 to allow clamp ends 41 of the clamps 37 to be engaged at the bus rails, whereby the positioning stays 55, 56 and 57 determine the location.

The illustrated input adapter involves an arrangement for three phases of a bus bar system. The present invention also allows the adapter housing to be set up for only one contact plate with a corresponding clamping arrangement. For a three-phase bus bar system, then, three simple input adapters of this type are required. The contact plates of the input adapters can also have several options for connecting various input leads.

Bus rails of various thicknesses and widths can be used in bus bar systems. In order to make the input adapter universally usable, a further development makes provides that the adjusting range of the clamps be adapted to the maximum thickness of the bus rails of the bus bar system, and provides recesses on the rear of the adapter housing in the area of the clamps, the width of which corresponds to the maximum width of the bus rails plus the width of the clamp ends.

In the event the input adapter is to be used for bus bar systems with varying spacing between the bus rails, then an additional provision is made for the clamps to be adjustable with respect to the contact plates and set for different spacings of the bus rails in the bus bar system.

While the principles of this invention have been described in connection with specific embodiments, it should be understood clearly that these descriptions are made only by way of example and are not intended to limit the scope of the invention.

What is claimed:

1. An input adapter for electrical connection of input leads to bus rails of a bus bar system comprising:
   an adapter housing which may be placed over the bus rails;
   at least one contact plate held in the housing in position facing a respective bus rail;
   a clamp adjacent to each contact plate, said clamp being U-shaped and having a side leg with a free end engagable with the rear of the bus rail and an opposed cross member with a threaded hole;
   a clamp screw adjacent one portion of the contact plate and adjustably engaged in the threaded hole of the clamp cross member to provid means to clamp the contact plate onto the bus rail; and
   the contact plate having another portion with a hole for securement of an input line.

2. The input adapter of claim 1 wherein the adapter housing comprises:
   a housing plate placeable on the bus rails, the housing plate having recesses aligned with the bus rails, each contact plate in its own recess; and
   side walls along the length of the housing plate and partitions spaced therebetween to form chambers on the top housing plate for input lines leading to the contact plates in the recesses.

3. The input adapter of claim 2 comprising:
   positioning ribs are formed at the partitions bordering the recesses and positioned to brace the contact plates in the recesses;
   cap portions partially covering the recesses; and
   brace springs extending from the cap portions and engaging the contact plates to hold them firmly in place.

4. The input adapter of claim 3 wherein the contact plates are rectangular and arranged with their longer sides transverse to the bus rails, the positioning ribs located to engage the shorter sides of the contact plates.

5. The input adapter of claim 1 wherein there are a pair of side legs, such side legs having a spacing therebetween no less than the width of the contact plates, and the side legs being spaced from the cross member of the clamp by a distance at least as great as the sum of the thickness of a contact plate and the maximum thickness of a bus rail.

6. The input adapter of claim 5 wherein the clamp side legs have narrow sides facing the bus rail which are grooved.

7. The input adapter of claim 3 wherein the cap portion has a socket-shaped guide portion which accepts the clamp screw and a hole through the guide portion making the clamp screw accessible through the cap portion by way of the boring.

8. The input adapter of claim 7 wherein the cap portion has a recess of cross-section greater than a positioning rib aligned therewith, thereby facilitating its manufacture.

9. The input adapter of claim 1 characterized by the fact that the recesses have positioning stays located for engagement with the bus rails along one side thereof, the positioning stays being coincident with the cap portions.

10. The input adapter of claim 1 wherein the input lead has an eyelet-shaped attached to the contact plate by means of a screw engaged in a threaded hole in the contact plate.

11. The input adapter of claim 1 wherein the input lead includes a flat contact, a U-shaped clamp plate having an opening receiving the flat conaact, and a clamp screw attached to a threaded hole in the contact plate.

12. The input adapter of claim 1 wherein the lead end of an insulated input line is clamped to the contact plate by means of a clamp plate secured to two threaded holes in the contact plate.

13. The input adapter of claim 1 wherein the adjusting range of the clamps is adapted to the maximum thickness of the bus rails of the bus bar system, the adapter housing having recesses on its underside in the clamp area corresponding to the maximum width of the bus rails plus the width of the clamp ends.

14. The input adapter of claim 1 wherein the clamps are adjustable wtth respect to the contact plates and can be set to different spacing of the bus rails of the bus bar system.

* * * * *

UNITED STATES PATENT AND TRADEMARK OFFICE
CERTIFICATE OF CORRECTION

PATENT NO. : 4,832,627
DATED : May 23, 1989
INVENTOR(S) : Hans Wagener, Jurgen Zachrei, Udo Munch It is certified that error appears in the above-identified patent and that said Letters Patent is hereby corrected as shown below:

In Column 2, line 60, change "ff" to --of--.

In Column 4, line 22, change "screws 33" to --screws 53--.

In claim 11, line 3, change "contaact" to --contact--.

Signed and Sealed this

Twenty-third Day of January, 1990

Attest:

JEFFREY M. SAMUELS

Attesting Officer     Acting Commissioner of Patents and Trademarks